US010176469B2

(12) United States Patent
Mao

(10) Patent No.: US 10,176,469 B2
(45) Date of Patent: Jan. 8, 2019

(54) INTERACTIVE JEWELRY VENDING MACHINE

(71) Applicant: BEZALEL'S JEWELRY INC., San Diego, CA (US)

(72) Inventor: Yuen Hui Mao, San Diego, CA (US)

(73) Assignee: BEZALEL'S JEWELRY INC., San Diego, CA (US)

( * ) Notice: Subject to any disclaimer, the term of this patent is extended or adjusted under 35 U.S.C. 154(b) by 239 days.

(21) Appl. No.: 15/386,728

(22) Filed: Dec. 21, 2016

(65) Prior Publication Data

US 2018/0174125 A1 Jun. 21, 2018

(51) Int. Cl.
*G06Q 20/20* (2012.01)
*G06Q 20/24* (2012.01)

(52) U.S. Cl.
CPC ........... *G06Q 20/204* (2013.01); *G06Q 20/24* (2013.01)

(58) Field of Classification Search
CPC ............................ G06Q 20/204; G06Q 20/24
See application file for complete search history.

(56) References Cited

U.S. PATENT DOCUMENTS 1,198,210 A 9/1916 Giles
3,929,255 A 12/1975 Wittern et al.
4,860,876 A * 8/1989 Moore .................... G07F 7/069 194/205
4,903,815 A * 2/1990 Hirschfeld ............. G07F 7/069 194/205
4,941,714 A * 7/1990 Seymour .................. A47F 3/00 312/223.5

(Continued)

FOREIGN PATENT DOCUMENTS

CN 204537319 * 4/2015
CN 207249810 * 4/2018

(Continued)

OTHER PUBLICATIONS

Ford, Daniel. "Gitanjali Selling Jewelry by Vending Machine". <https://www.jckonline.com/editorial-article/gitanjali-selling-jewelry-by-vending-machine/>. Retrieved Oct. 2018. Published Oct. 2011.*

(Continued)

*Primary Examiner* — Nathan A Mitchell
(74) *Attorney, Agent, or Firm* — Coastal Patent Law Group, P.C.

(57) ABSTRACT

Enables an interactive jewelry vending machine configured to enable users to quickly and conveniently purchase jewelry. The interactive jewelry vending machine allows users to view a rendition of the jewelry on their person with images taken by the camera and displayed on the point of sale system. Through a wireless communication system, users may check the inventory of each vending machine and purchase products remotely. The wireless communication system also provides additional security for the interactive jewelry vending machine by relaying alarm signals during break in attempts and sending out position signals when movement of the interactive jewelry vending machine is detected. An internal battery may power the wireless communication system when the interactive jewelry vending machine is no longer connected to an external power source.

20 Claims, 7 Drawing Sheets

(56) References Cited

U.S. PATENT DOCUMENTS

| | | | | | |
|---|---|---|---|---|---|
| 5,020,958 | A * | 6/1991 | Tuttobene | G07F 7/069 221/88 |
| 5,303,844 | A * | 4/1994 | Muehlberger | G07F 7/069 221/1 |
| 5,860,714 | A | 1/1999 | Skord | |
| 7,604,145 | B2 * | 10/2009 | Percy | G07F 11/42 221/126 |
| 8,788,341 | B1 * | 7/2014 | Patel | G07F 11/42 700/231 |
| 2002/0184104 | A1 * | 12/2002 | Littman | G06Q 30/06 705/26.8 |
| 2003/0063969 | A1 * | 4/2003 | Chirnomas | G07F 11/04 414/626 |
| 2003/0125836 | A1 * | 7/2003 | Chirnomas | G07F 9/02 700/236 |
| 2004/0104239 | A1 * | 6/2004 | Black, Jr. | G07F 11/04 221/124 |
| 2005/0216120 | A1 * | 9/2005 | Rosenberg | G07F 9/02 700/244 |
| 2006/0254862 | A1 * | 11/2006 | Hoersten | G06Q 10/06311 186/52 |
| 2007/0084877 | A1 * | 4/2007 | Albert | G07F 11/16 221/289 |
| 2008/0093371 | A1 * | 4/2008 | Ubidia | B25J 9/041 221/1 |
| 2011/0004338 | A1 * | 1/2011 | Bianco | G07F 11/62 700/235 |
| 2011/0047062 | A1 * | 2/2011 | Kerschner | G06Q 40/04 705/37 |
| 2011/0226795 | A1 * | 9/2011 | Sichich | G07F 11/165 221/1 |
| 2012/0277904 | A1 * | 11/2012 | Pritchard | G07F 9/02 700/232 |
| 2014/0343726 | A1 * | 11/2014 | Berry | G07F 9/026 700/236 |
| 2014/0358705 | A1 * | 12/2014 | Harrington | G06Q 20/322 705/16 |
| 2015/0021348 | A1 * | 1/2015 | Stinson | G07F 11/165 221/1 |
| 2015/0041486 | A1 * | 2/2015 | Shen | G07F 11/04 221/154 |
| 2016/0071052 | A1 * | 3/2016 | Henry | G06Q 10/087 235/380 |
| 2016/0314640 | A1 * | 10/2016 | Ward | G07F 17/42 |
| 2018/0218439 | A1 * | 8/2018 | Jagannath | G06Q 10/02 |

FOREIGN PATENT DOCUMENTS

| | | | | |
|---|---|---|---|---|
| CN | 207249814 | * | 4/2018 | |
| EP | 1496481 A2 | * | 1/2005 | G06F 19/326 |
| WO | WO2017203546 | * | 11/2017 | |

OTHER PUBLICATIONS

Bates, Rob. "Richline Introducing Jewelry Vending Machine". <https://www.jckonline.com/editorial-article/richline-introducing-jewelry-vending-machine/>. Retrieved Oct. 2018. Published May 2012.*

Bowden, Bridgit. "Creating a High-Tech Vending Machine, To Dispense Local Art". <http://www.flatlandkc.org/news-issues/economy/creating-high-tech-vending-machine-dispense-local-art/>. Retrieved Oct. 2018. Published Jan. 2015.*

Finney, Kaliyana. "Inside a Vending Machine Image Gallery". <https://electronics.howstuffworks.com/gadgets/other-gadgets/vending-machine-pictures.htm>. Retrieved Oct. 2018. Published Mar. 2011.*

* cited by examiner

INTERACTIVE JEWELRY VENDING MACHINE

BACKGROUND OF THE INVENTION

Field of the Invention

One or more embodiments of the invention are related to the field of data processing systems and communication systems. More particularly, but not by way of limitation, one or more embodiments of the invention enable an interactive jewelry vending machine configured to enable users to quickly and conveniently buy jewelry or souvenirs.

Description of the Related Art

Vending machines have been used for many years to dispense a variety of different products, in a variety of configurations, as evidenced by any one or all of the following patents: U.S. Pat. No. 1,198,210, issued Sep. 12, 1916 to Harvey Giles; U.S. Pat. No. 3,929,255, issued Dec. 30, 1975 Wittern et al.; and U.S. Pat. No. 5,860,714, issued Jan. 19, 1999 to Skord, Jr.

These patents generally teach a conventional vending machine includes a housing that stores the items for sale, a glass window for consumers to view the items for sale, a currency acceptor configured to take coins, tokens, credit cards, or paper money, and a dispensing mechanism to disburse items that have been paid for. These vending machines usually are filled from a front or rear access door that would allow the owner to fill the housing with the items for sale. The items for sale may either be placed loosely inside of the vending machine or in a guided configuration to allow the disbursement of specific items to the user. In most cases, vending machines carry food products, assorted candy, or items specific to the location of the vending machine, such as car products at a car wash. In general, known vending machines sell inexpensive items and thus do not require security features or any interactive features that enables a user to see what the item being purchased would look like on the user.

To purchase a specific product, consumers pay a predetermined amount or swipe their credit card, which after items for sale are disbursed, is charged. To choose a specific item users typically punch in letters, numbers or a combination of both corresponding to the item the user paid for. However, if the vending machine has been improperly loaded, the user may receive a different product then they anticipated. This leads to unhappy customers that will be less likely to use the vending machine in the future. For example, in general existing vending machines do not scan the item for a bar code before dispersing the item, and hence are at the mercy of the worker that loads items into the individual slots.

Also, there is currently no way for a consumer to test the item that they wish to purchase from the vending machine. The only way a consumer can test an item is to purchase it and hope that it meets their needs. In cases where the item is not exactly what the consumer hoped for, the consumer can be less likely to use the vending machine again, which will result in lower sales from the machine. For example, existing vending machines do not provide a view of the user in combination with any of the items for sale in the vending machine, thus a user has no idea what the product would look like if the product is worn by the user.

With respect to security, typical vending machines lack secure windows or bodies since the value of the contents are generally not extremely valuable. Existing vending machines do not provide remote alarms or relay their position if moved or stolen, do not provide any hindrance to being moved, such as liquids that spill if the vending machine are moved, and in addition, do not capture pictures of users around the vending machine in case of break-in or theft. As the value of the items for sale has increased, the need for additional security features to protect the vending machine has also increased. The Skord, Jr. '714 Patent, discloses a window for viewing products that uses high strength polycarbonate instead of glass typical of non-secure vending machines. In addition, the body of the vending machine in the '714 Patent is constructed with higher strength metals. The '714 Patent takes security one step further, by recessing the vending machine in a wall and covering it with a metal grating. The Skord, Jr. '714 Patent, however, lacks other security and theft deterring features as well as interactive features described above.

For at least the limitations described above there is a need for an interactive jewelry vending machine.

BRIEF SUMMARY OF THE INVENTION

One or more embodiments are related to an interactive jewelry vending machine. Specifically, embodiments of the invention include an apparatus to display and sell jewelry that includes a body, viewing window, a plurality of products, at least one light, a plurality of product trays, a camera, a point of sale (POS) system, a credit card reader, a control board, a product collection arm, a plurality of height sensors, at least one barcode scanner, a plurality of first motors, a second motor, a product collection bin, a wireless communication system. In one or more embodiments, each product compartment may include a barcode scanner so that when the products are refilled in each compartment, the barcode scanner can identify the products and supply the inventory to the POS system. The viewing window may be coupled with the body to illuminate the plurality of products. Embodiments of the invention may utilize secure materials for the viewing window to properly secure and display the plurality of products. The light may be coupled with the body to illuminate the plurality of products. The positioning of the light may be moved in embodiments of the inventions to ensure the plurality of products are properly illuminated. The configuration of the product trays may be configured to sell the number and type of products desired by the user. The point of sale system may be coupled with the camera. The camera may be configured to display images on the point of sale system. With images from the camera, a rendition of the user may be displayed with a product or products from the plurality of products, for example the product or products may be displayed on or in combination with the image of the user. This provides the user with a better idea of what the product would look like if worn, as opposed to the state of the art, which requires guesswork by the user. The credit card reader may be coupled with the point of sale system to allow the user to purchase from the plurality of products. The control board may be coupled with the point of sale system. In one or more embodiments, the control board may be electrically coupled with the point of sale system. In other embodiments, any method of coupling may be used. The product collection arm may be configured to move vertically inside the body after receiving commands from the control board towards one of the plurality of products. The height sensors may be electrically or wirelessly coupled with the control board, and configured to relay the product collection arm's position. The barcode scanner may be coupled with the product collection arm and may be configured to move horizontally in front of the plurality of products. The motor, or plurality of first motors may be configured to move one or more of the plurality of products towards the product collection arm. The second motor may be coupled with the product collection arm and configured to move one of the plurality of products towards the product collection bin. The wireless communication system may be configured to relay availability of the plurality of products, allow remote purchase of the plurality of products, relay alarm signals during break in attempts, and relay position signals from the interactive vending machine if movement is detected. A battery may be electrically coupled to the wireless communication system and may be used in conjunction with or without an external electricity source. In one or more embodiments, the battery allows the wireless communication system to maintain functionality after the interactive jewelry vending machine has been moved. One or more embodiments of the invention may utilize power from an internal battery such that even if the machine is unplugged, the wireless communication system may transmit a location signal wirelessly to enable the machine to be located if stolen. Embodiments of the invention may utilize a GPS chip or triangulate in any manner with wireless signals to obtain a location or calculate a location of the system. In one or more embodiments, the system may appear powered off when unplugged, yet still supply power to the processor, wireless communications system and position determination hardware and/or camera, which may be hidden, in order to provide recovery functionality in case of theft.

In one or more embodiments of the invention, the body may further comprise a water tank that provides additional weight to the body. Embodiments of the invention do not require a water tank however and may utilize any other type of system or mechanism to make the system harder to move, such as bolts that physically attach the system to a floor, wall or ceiling for example. In one or more embodiments, the water tank may hold water and/or chemicals that smell bad, are sticky, slippery or oily to make theft less desirable, for example if the water tank is tipped and the water and/or chemicals spill out of the unit.

In one or more embodiments of the invention, the body may further comprise a security gate configured to cover the plurality of products. The material of the security gate may be implemented with any level of strength, thickness or security level in order to suit the protection needs of the user. Embodiments of the invention do not require a security gate however. One or more embodiments of the invention may utilize at least one camera that is visible or hidden in order to relay activity status at the machine to a centralized or distributed monitoring service.

In one or more embodiments of the invention, the product collection door may be configured to cover, hold or otherwise protect one of the plurality of products purchased by the user until it is removed from the product collection bin.

In one or more embodiments of the invention, the point of sale system may further comprise an application scanner to allow users to retrieve products purchased remotely. These embodiments enable a customer to pick up products from the vending machine after purchase for example, such as when purchasing from a vending machine that is out of a product, wherein the system may query the user if they would like to purchase the product and pick it up from a different instance of the system at a different location. In one or more embodiments, a customer can pay at the vending machine even if the product has sold out and the customer can enter a shipping address into the point of sale system and/or app on the user's mobile device. The product may then be shipped from a warehouse for example to fulfill the purchase.

In one or more embodiments of the invention, the plurality of height sensors may communicate with the control board to inform the control board and processor thereon that the product collection arm is parallel to the product collection bin.

In one or more embodiments of the invention, the at least one light may comprise a plurality of lights. The number, type and placement of lights may be altered as desired to properly showcase the plurality of products. Embodiments of the invention do not require a plurality of lights however. In one or more embodiments, the product showcase itself is a light box.

In one or more embodiments of the invention, the plurality of first motors may be coupled with a plurality of helical coils configured to move the plurality of products towards the product collection arm. Embodiments of the invention do not require a plurality of helical coils however.

BRIEF DESCRIPTION OF THE DRAWINGS

The above and other aspects, features and advantages of the invention will be more apparent from the following more particular description thereof, presented in conjunction with the following drawings wherein.

DETAILED DESCRIPTION OF THE INVENTION

An interactive jewelry vending machine will now be described. In the following exemplary description, numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims, and the full scope of any equivalents, are what define the metes and bounds of the invention.

Figure 1:
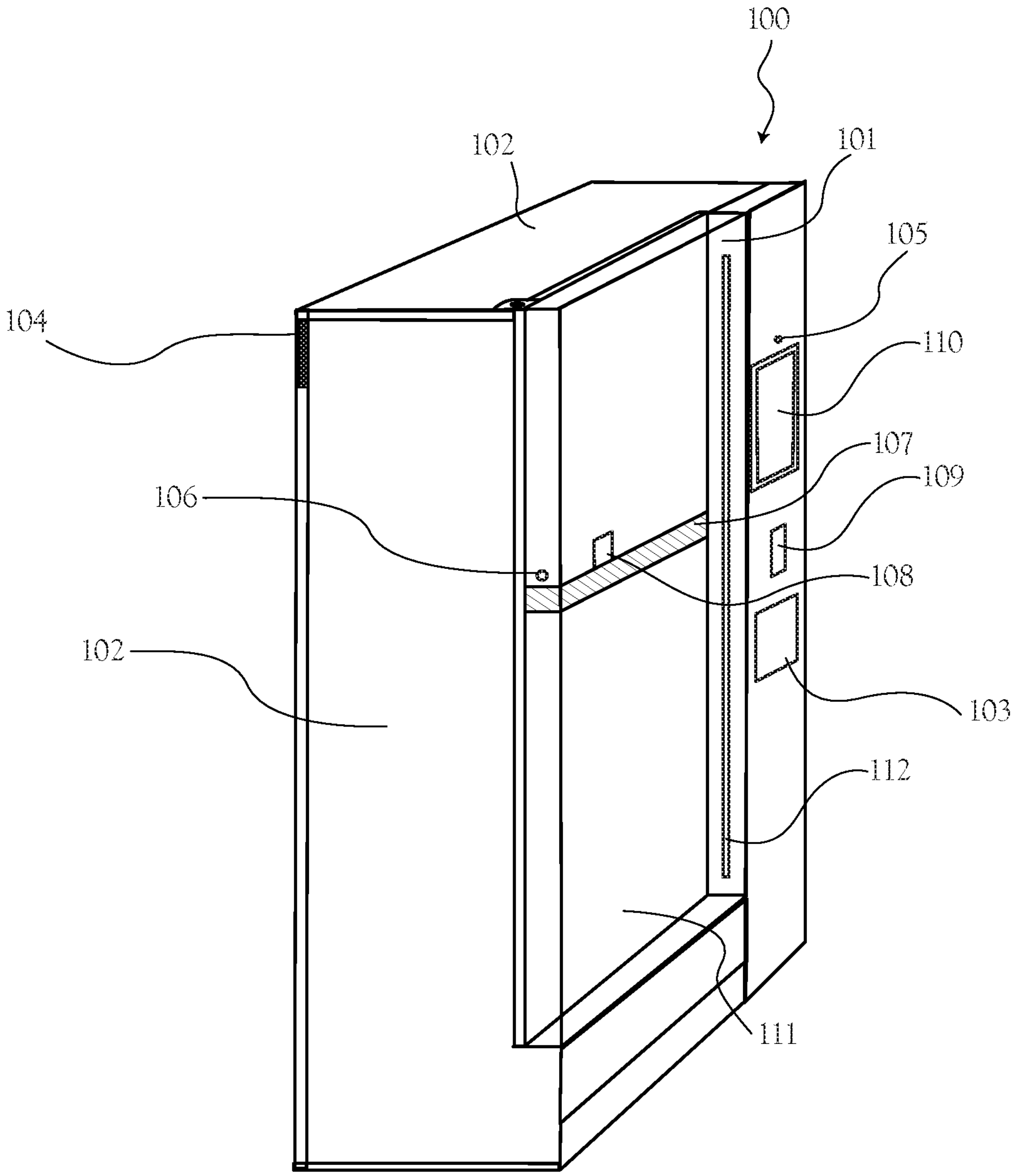
FIG. 1 illustrates a perspective view of at least one embodiment of the interactive jewelry vending machine.

FIG. 1 shows a perspective view of the interactive jewelry vending machine 100 that is configured to display and sell jewelry that includes a viewing window 101, body 102, product collection opening or door 103, control board 104, camera 105, second motor 106, (see FIG. 3 for first motor 304), product collection arm 107, barcode scanner 108, credit card reader 109, point of sale system 110, lightbox or light 111, plurality of height sensors 112. See also FIG. 6 for the electronic architecture of the system, wherein processor 601 may reside on control board 104 and couple directly or indirectly with the elements described above as well as speaker 602, location determination unit 603, battery 604, power plug 605, lights 606, wireless system 607. As shown light 111, may be implemented with a translucent or opaque background that enables products to be placed thereon. In one or more embodiments, product collection arm 107 is place in front of the light 111, nearer to viewing window 101, and in other embodiments, the product collection arm 107 may be implemented to be hidden behind light 111. The embodiments where the product collection arm 107 is behind the light box enable an uninterrupted view of the products coupled to or in front of the light box or light 111. In one or more embodiments a bar code scanner 108 may be located in each slot in the machine to scan the bar code of each product placed in each slot for example. The mechanism for moving products forward to the collection arm and moving the product to the product collection opening or door 103 is described in relation to FIG. 3 below.

Figure 2:
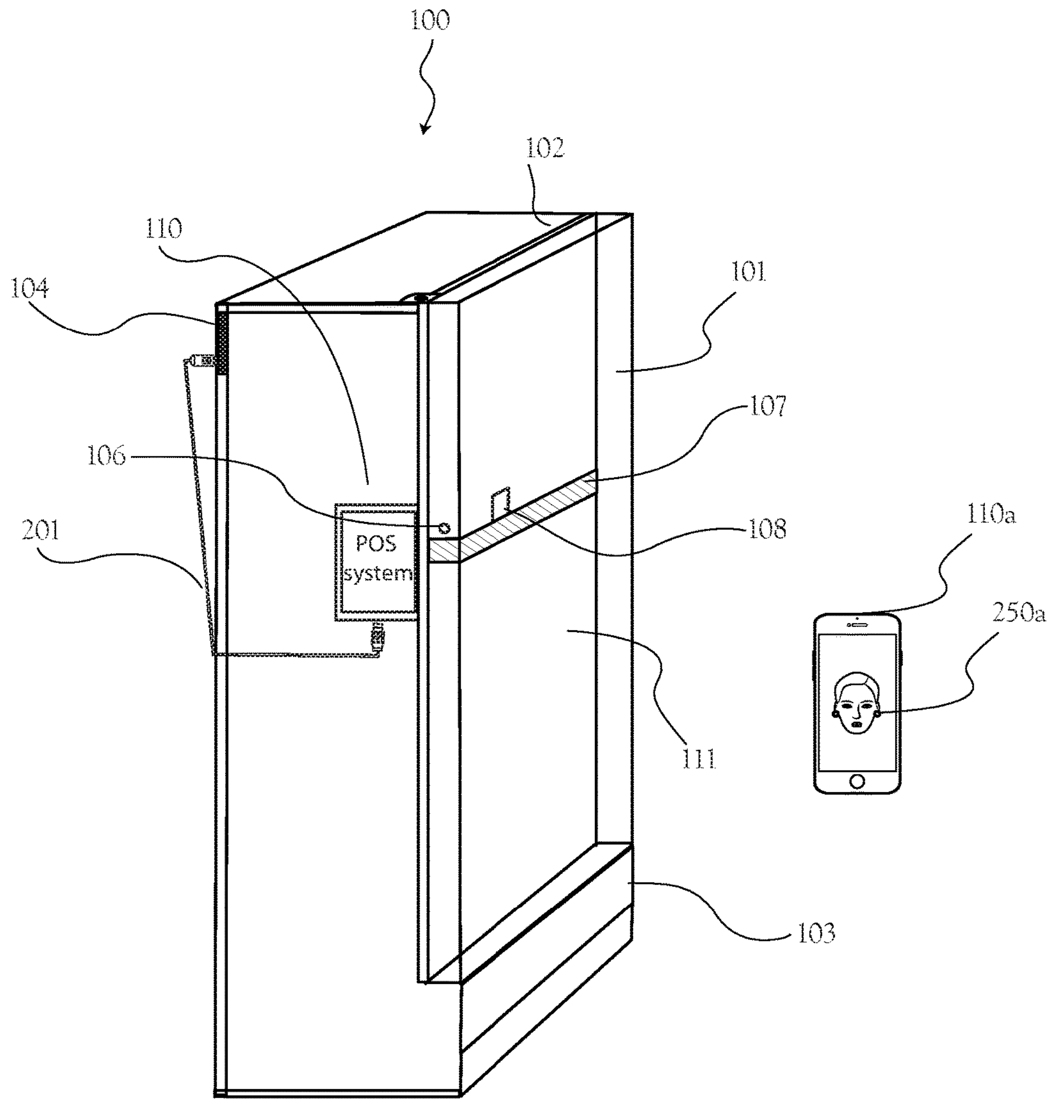
FIG. 2 illustrates a perspective view of at least one embodiment of the interactive jewelry vending machine with the point of sale system externally connected and/or implemented with wireless connectivity to an external device, such as a mobile phone.
Figure 6:
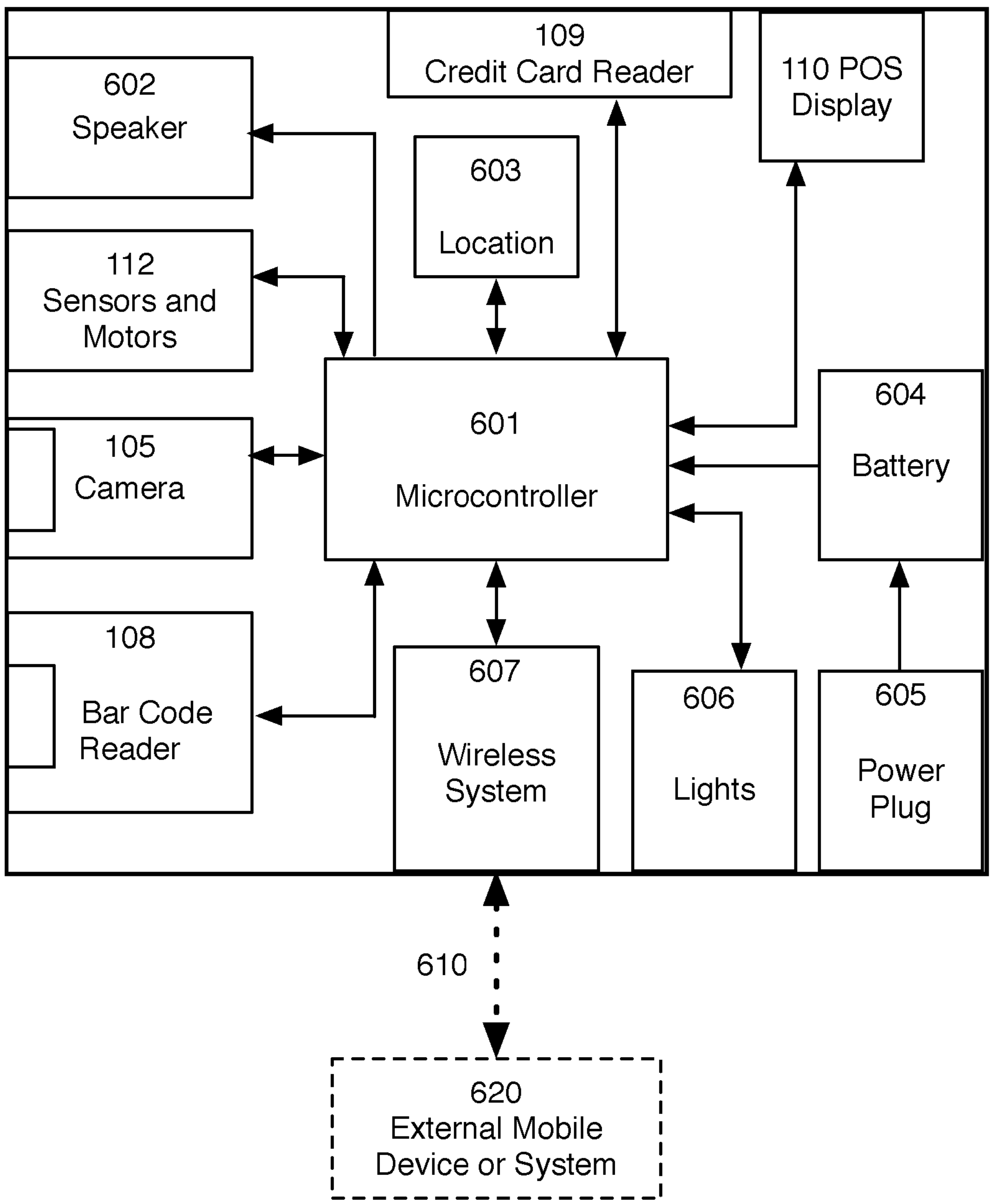
FIG. 6 illustrates the electronic architecture of the system.

Embodiments of the connection between point of sale system 110 and control board 104, may also utilize any suitable coupling method that enables communication between the point of sale system 110 and control board 104. As shown in FIGS. 1 and 6, the coupling may be direct electrical coupling, or in other embodiments described further below may include wireless coupling for example. Control board 104 may wirelessly couple with an external system 620, including the Internet or phone system or mobile device (as shown in FIG. 2 110*a*) or any combination thereof to enable transmitting location information if the control board determines that the system has or is being moved, or to report inventory or reserve items bought at another vending machine that the user will pick up. In one or more embodiments, control board 104 may include a battery 604 as shown in FIG. 6, or battery backup or may couple with a battery backup internal to body 102 for example to ensure that if the system is unplugged, that the control board may continue to communicate with external computers even though the system may appear to be powered down. This increases the security of the system and provides a measure of confidence in finding a stolen machine for example. The control board itself may be securely mounted within the body so that it may not be easily removed, and may include any type of locking mechanism to couple the control board to the body for example in a secured manner. In one or more embodiments of the invention, the system may include a siren and flashing lights, implemented with speaker 602 and lights 606 for example, that provide sound and light if the system is moved. In one or more embodiments, the system may send a silent alarm, for example over wireless system 607 as shown in FIG. 6 to capture thieves by delaying their exit. In one or more embodiments of the invention, to determine if the system has moved or is moving, one or more of GPS, triangulation, accelerometers or any other type of motion or location detection devices may be coupled with control board 104, for example any one of which or combination of which may reside in location determination unit 603.

In one or more embodiments, the viewing window 101 may be coupled with the body to illuminate the plurality of products by any suitable manner of attachment. The manner of attachment may include but is not limited to adhesive or fastener systems to the body 102. Embodiments of the invention may change the material of the viewing window 101 to properly secure and display the plurality of products. In one or more embodiments, the viewing window 101 material may be used to further protect the contents of the vending machine such as security glass, tempered glass, or polycarbonate. The at least one light 111 may be coupled with the body 102 to illuminate the plurality of products by any suitable manner of attachment. The manner of attachment may include but is not limited to adhesives, fastener system, or welding directly to the body 102. The positioning of the at least one light 111 may be moved in embodiments of the inventions to ensure the plurality of products are properly illuminated, for example as coupled with or near bar code reader 108 or on arm 107, which may move or anywhere else inside the apparatus, for example between viewing window 101 and light box or light 111. In one or more embodiments, the type of the at least one light 111 may be an LED, a LED strip, a tape light strip, a fluorescent bulb, G4 type bulb, CFL, halogen or any variant or combination thereof. The type and combination the at least one light 111, may be modified by the user to ensure that the plurality of products in the vending machine are properly illuminated. Diamonds, gems and other jewelry, do not create light, but reflect light. Some believe that stones and jewelry shine their brightest under natural light. In one or more embodiments, the at least one light 111 is an LED or LED combination due to their ability to mimic natural light, or otherwise alter the spectrum of emitted light so that the contents of the vending machine can be displayed with maximum radiance.

In one or more embodiments, the point of sale 110 may be coupled with the camera 105. The camera 105 can be configured to display images on the point of sale system 110, for example of the user with superimposed product images on the user as described below in FIG. 2. In one or more embodiments, the camera 105 can be utilized to modulate the number and intensity of the at least one light 111 to match the height of the user. This feature ensures that the plurality of the products will be illuminated by the at least one light 111 with maximum radiance for each user, and based on that user's height. In one or more embodiments, arm 107 may move based on the height of the user as per motor 112 in FIG. 6 via microcontroller 601, wherein light 606 may be moved via the arm to better display a product, and the intensity of frequency spectrum of the light may be altered via lights 606, which may be a light controller for example or directly couple with at least one light 111. In embodiments where the product collection arm 107 is behind the light box or light 111, then lights between the viewing window 101 and the light box or light 111, (for example along the edge of viewing window 101 closest to the front of the apparatus as shown in FIG. 1), may be varied in intensity or frequency spectrum or both and may be based on the height of the user as determined by capturing an image with camera 105. In this way, the area at approximately the height of the user's eyes may have an increased light quality while the rest of the light box or light 111 may have a diminished light quality. With images from the camera 105, a rendition may be displayed with a product or products from the plurality of products, displayed on the camera image of the user. In one or more embodiments, images from the camera may be converted to 3D images, either using any type of 2D to 3D conversion method or alternatively may query the user to move side to side to create stereoscopic views of the user. In one or more embodiments camera 105 may include two offset cameras to capture two images of the user to create a 3D view of the user. Whether 2D or 3D, the user may virtually try on a product before purchasing it and the POS system may display the product on the user in 2D or 3D. In one or more embodiments, the POS system may display 2D or 3D advertisements as well. In one or more embodiments, the camera 105 may capture an image of a person or record a video in the case of a robbery attempt, for example as detected by the control board via motion sensors, open/close door sensors, shatter sensors, GPS sensors or in any other manner. Images from the camera 105 may be broadcast from the wireless system, for example inherently coupled with the control board to the owner and/or security or police during a robbery attempt, for example over wireless system 607 shown in FIG. 6. In one or more embodiments, the camera 105 may be configured to take a picture of a receipt to allow a user to pick up products that have been remotely purchased.

In one or more embodiments, the credit card reader 109 may be coupled with the point of sale system 110 to enable the user to purchase from the plurality of products. In one or more embodiments, the credit card reader 109 may be an EMV chip reader, traditional swipe reader, or a wireless reader. The control board 104 may be coupled with the point of sale system 110. In one or more embodiments, the control board 104 may be electrically coupled with the point of sale system 110, product collection door 103, camera 105, second motor 106, product collection arm 107, barcode scanner 108, credit card reader 109, at least one light 111, plurality of height sensors 112, USB cord (not shown), LED lights (not shown), or plurality of first motors (not shown). In all other embodiments, any method of coupling may be used. The product collection arm 107 may be configured to move vertically inside the body 102 after receiving commands from the control board 104 towards one of the plurality of products. In embodiments where the plurality of height sensors 112 are electrically coupled with the control board 104, they may be configured to relay the product collection arm's 107 position. The barcode scanner 108 may be coupled with the product collection arm 107 and configured to move horizontally in front of the plurality of products. The second motor 106 may be coupled with the product collection arm 107 and configured to move one of the plurality of products towards the product collection bin 103. As shown if the bar code scanner 108 is viewing a product's bar code as shown and it matches the selection of the user, then the product may be pushed forward to the product collection arm and then the second motor may be utilized to move the product laterally over to product collection bin 103 for example. In one or more embodiments, the product collection arm is moved down vertically to the level of the product collection bin or door 103 and then a belt drive in the product collection arm moves the product laterally to the product collection bin or door 103.

In one or more embodiments, the wireless communication system (not shown) may be configured to relay availability of the plurality of products, allow remote purchase of the plurality of products, relay alarm signals during break in attempts, or relay position signals from the interactive vending machine if movement is detected. In one or more embodiments, the wireless communication system, may be integrated into the control board 104. In one or more embodiments a battery, for example coupled with the control board or external thereto, may be electrically coupled to the wireless communication system 607 (FIG. 6) and may be used in conjunction with or without an external electricity source. The battery 604 (FIG. 6) allows the wireless communication system to maintain functionality after the interactive jewelry vending machine 100 has been moved. In one or more embodiments, the battery may be lithium ion, lead acid, nickel metal hydrate, or nickel cadmium. In other embodiments, the battery may be any other suitable composition known to those of skill in the art. In other embodiments, a battery may not be needed for proper functionality of the interactive jewelry vending machine 100.

FIG. 2 illustrates a perspective view of the interactive jewelry vending machine 100 that includes product collection door 103 at the bottom of the apparatus, and point of sale system 110 connected to control board 104 by USB cord 201. While a USB cord 201 is shown, any suitable cable can be used such as Ethernet, SATA, fiber optic, or a serial cable. In one or more embodiments, the point of sale system 110, may be removed and stored by the user when the interactive jewelry vending machine 100 is not in use. The point of sale system 110 may hinge or be tethered to body 102. Alternatively, the POS system may be wirelessly coupled with the control board and in one or more embodiments may be an "App" that a user installs on a ubiquitous mobile device for example. In one or more embodiments, the control board 104 presents a list of products within the system that is shown on point of sale system 110, or on a local mobile device 110*a* for example. The user of the mobile device then may use local payment methods on the mobile device such as Apple Pay® or Google Pay® for example, or any other payment methodology such as PayPal® to pay for any selected item. Once the system receives the secure payment for example at control board 104, then system may disburse the product and may for example snap a photo with a camera such as 105 shown in FIG. 1, or from a camera on point of sale system 110 or on local mobile device 110*a* to save a picture of the person who purchases the product. In one or more embodiments, the picture of the user may be superimposed with the product wherein the image of the user may be improved or otherwise altered using any type of image processing system, such as described in U.S. Pat. No. 9,224,248, to Zhou et al, filed Aug. 8, 2013, entitled "Method of Virtual Makeup Achieved by Facial Tracking" which is hereby incorporated herein by reference. In one or more embodiments, the user may take a "selfie" and receive a picture of the product that an "app" associated with the vending machine thus uses to superimpose the product onto the picture of the user locally on mobile device 110*a*. In other embodiments, the selfie may be transmitted wirelessly by the app to the vending machine which therein superimposes the product onto the user and then either displays the superimposed picture on the POS system or on the mobile device 110*a* or both. As shown on point of sale system 110 implemented on local mobile device 110*a*, jewelry 250 is shown superimposed on an image of the user. Optionally, slight improvements to the user's makeup or other features may be performed, again using the '248 Patent or with any other image processing algorithm or system as desired.

Figure 3:
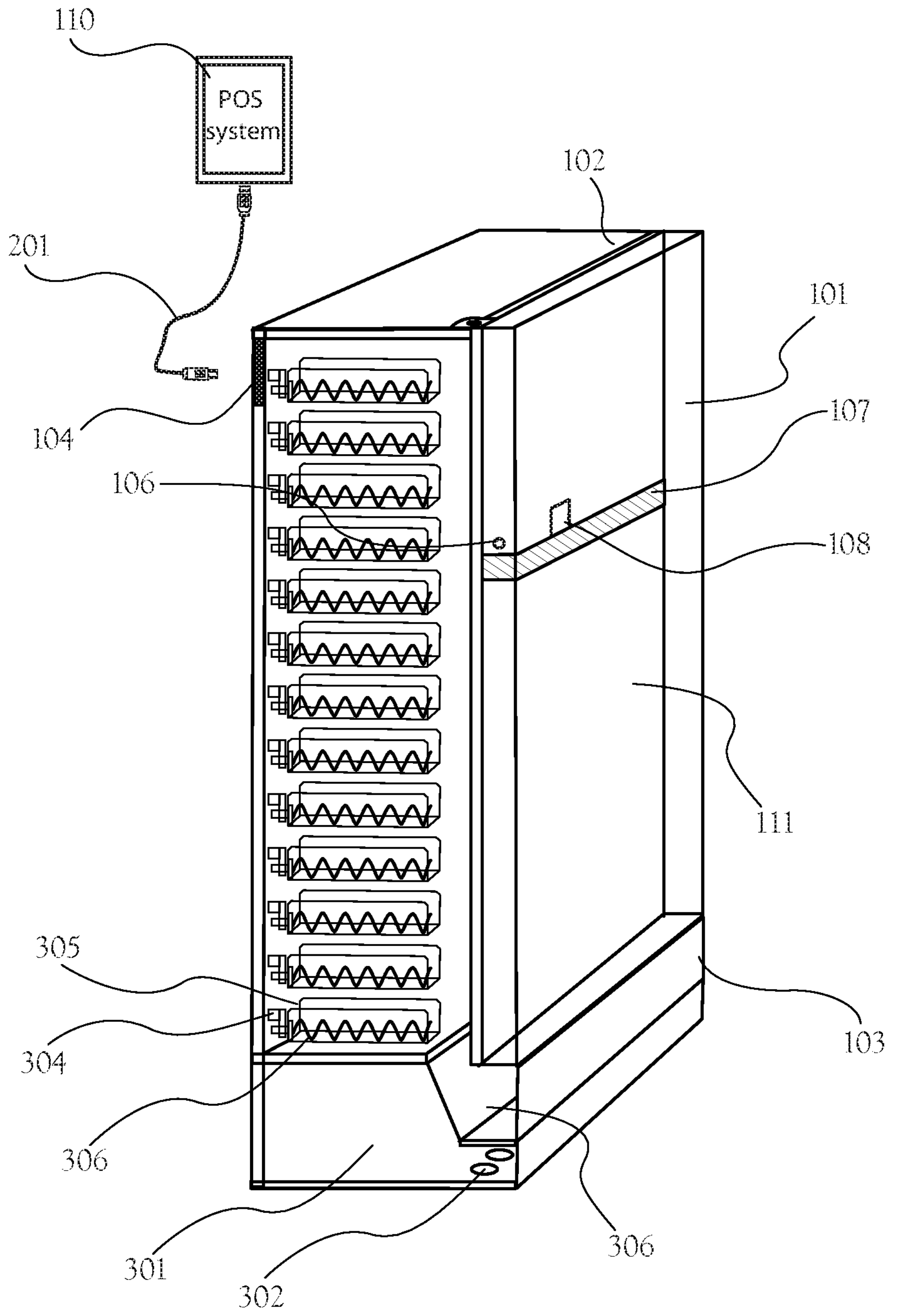
FIG. 3 illustrates a cutout perspective view of at least one embodiment of the interactive jewelry vending machine with the point of sale system externally connected.

FIG. 3 illustrates a cut out perspective view of the interactive jewelry vending machine 100 that is configured to display and sell jewelry that includes a viewing window 101, body 102, product collection door 103, control board 104, point of sale system 110, light 111, water tank 301, LED lights 302, helical coils 303, plurality of first motors 304, product tray 305 and product collection bin 306. As shown, the point of sale system 110 may be external to the device and/or may be utilized to control more than one vending machine at a time. In some scenarios, only one POS is utilized for chained configurations that have a plurality of vending machines situated in one area. Use of one POS for multiple collocated vending machines is unknown in the art. In these embodiments, the product collection door 103 may also be chained with other devices, for example with a belt drive on the bottom of the collection area behind product collection door in order to move any number of separate vending machine purchases to the area near the POS, (or any other pickup area designated on the chained set of machines for example). In one or more embodiments, multiple products may be placed in a bag or bags for example at the end of the product collection area. Other embodiments may interface with external sorting systems that may group products bought on one credit card wherein the customer swipes or shows the credit card at the store exit to pick up the products purchased. Embodiments of the system may for example interface the exit of the product collection area behind product collection door 103 to any external sorting system capable of collection products for pickup. In one or more embodiments, a helical coil 303, may be connected to each one of the plurality of first motors 304, to move the plurality of products. In other embodiments, any suitable method of moving the plurality of product such as, gates or moving panels, may be used. The product tray 305 may be tailored to the needs of each of the plurality of products, by adjusting the size and/or shape of the product tray 305. In one or more embodiments, the product collection door 103 may be configured to restrict access to the plurality of products. In other embodiments, the product collection door 103 may just protect the product collection bin 306. As shown, the point of sale system 110 is connected to control board 104 by USB cord 201 although in other embodiments wireless communications may be utilized as previously detailed. As shown, LED lights 302 may be optimized to show frequencies that highlight sparkle for example on jewelry and may be mounted anywhere inside body 102. In one or more embodiments, camera 105, or any other camera coupled with the system such as in point of sale system 110 may be utilized to determine the height of a user and alter LED lights 302 to optimize the sparkle or light quality at the viewing height of the user for example. Embodiments of the invention may determine if a particular product, for example in tray 305 is out of stock and wirelessly communicate through control board 104 to alert the administrator of the system to obtain more product. In one or more embodiments, the control board 104 may communicate with the user via point of sale system 110, or local mobile device 110*a* shown in FIG. 2 to enable the user to purchase the product even if it is not at the instant vending machine and show the user where to go to retrieve the product at another vending machine in order to enable the user to guarantee that the product purchase is locked in. The control board 104 may provide the location of the vending machine that has the product and reserve the product at the other vending machine at a different location if the user selects this option. Hence, at the second vending machine, the product will not be sold there if already purchased at a different vending machine.

Figure 4:
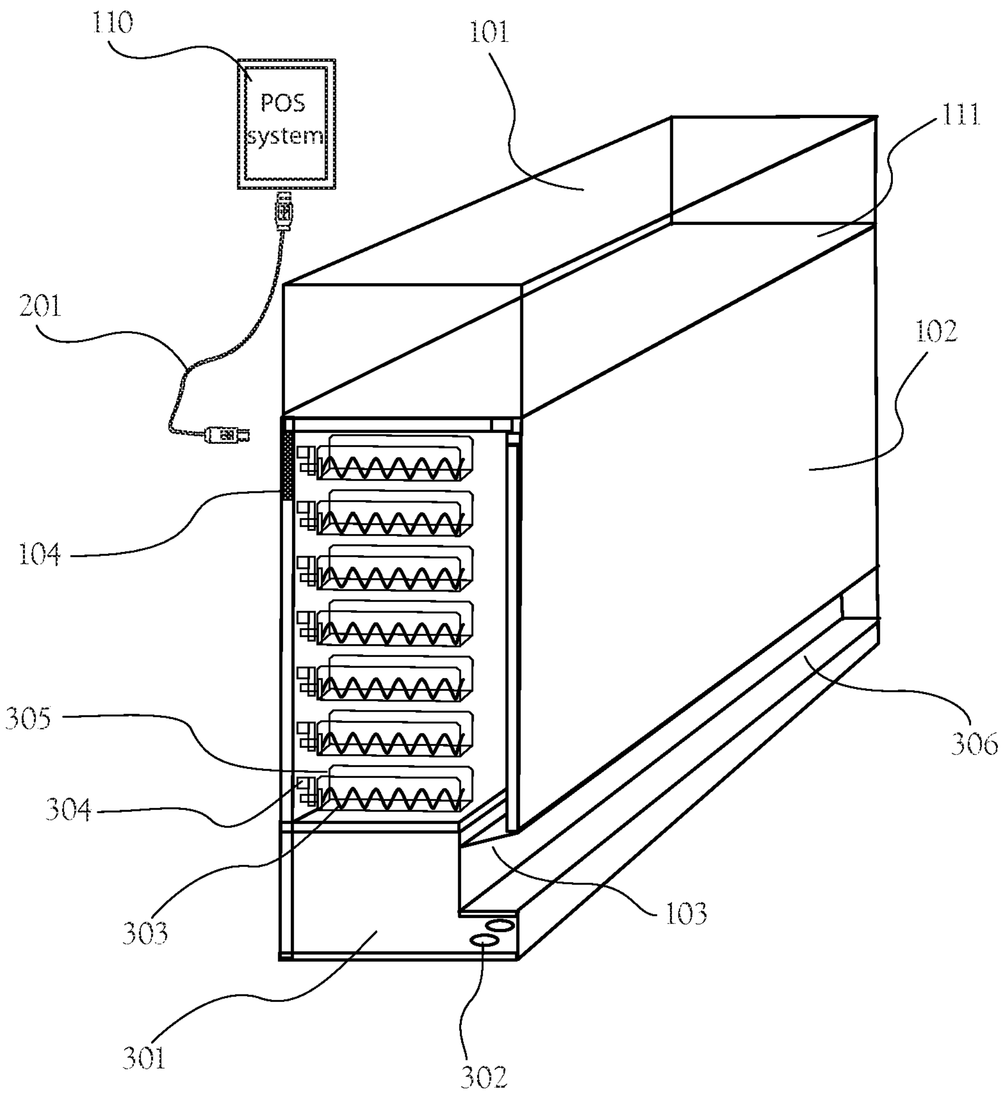
FIG. 4 illustrates a cutout perspective view of at least one embodiment of the interactive jewelry vending machine with the point of sale system externally connected and the product collection door open.

FIG. 4 illustrates a cut out perspective view of the interactive jewelry vending machine 100 that is configured to display and sell jewelry that includes a viewing window 101, body 102, product collection door 103, control board 104, point of sale system 110, light 111, water tank 301, LED lights 302, helical coils 303, plurality of first motors 304, product tray 305 and product collection bin 306. As shown, the point of sale system 110 is connected to control board 104 by USB cord 201. Embodiments of the connection between point of sale system 110 and control board 104, may also utilize any suitable coupling method that will allow communication between the two. As shown, the product collection door 103 is open, allowing access to product collection bin 306. Whether the showcase or viewing window is vertical oriented as per FIGS. 1-2 or horizontally oriented as per FIGS. 3-5, embodiments of the invention may utilize the same internal components for obtaining, and delivering products, for example helical coils 303.

Figure 5:
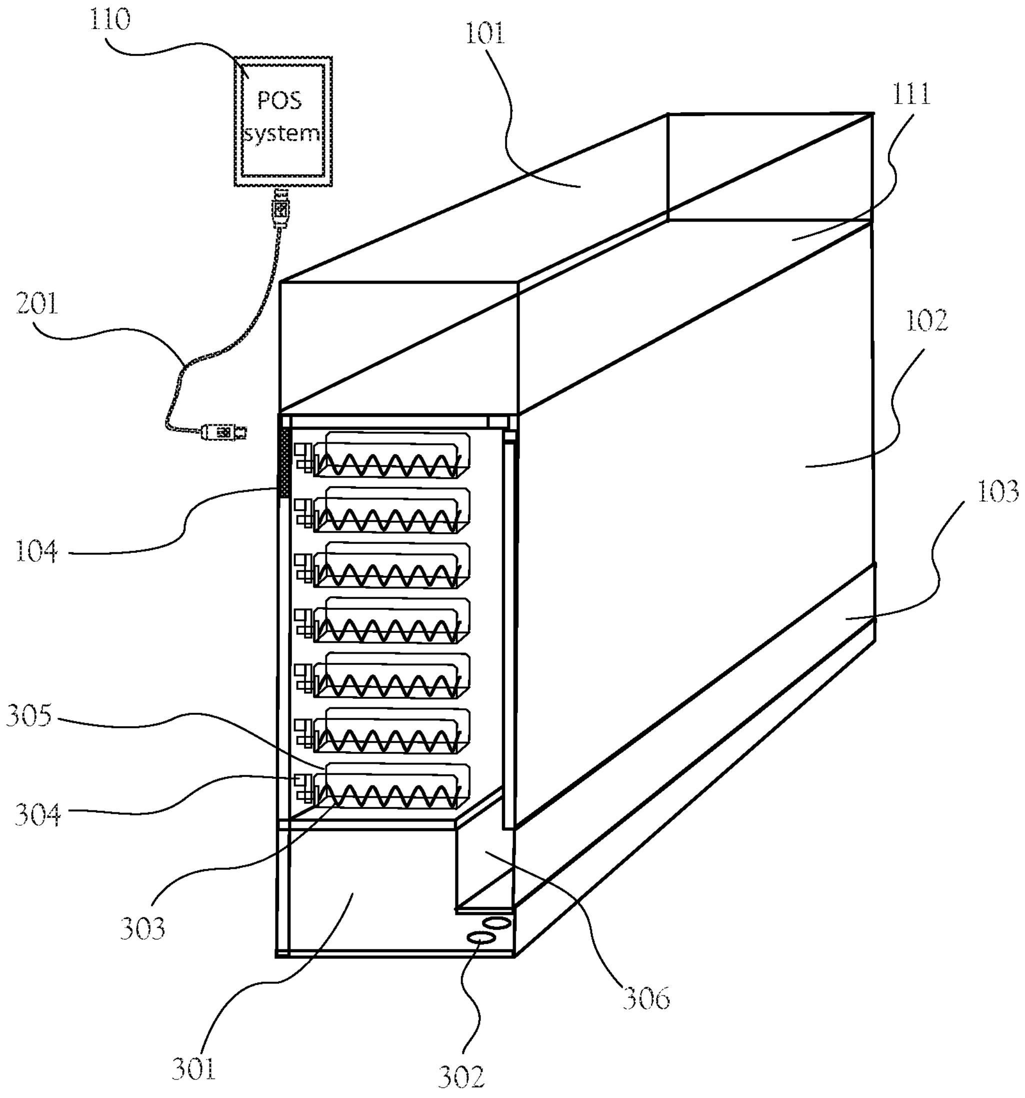
FIG. 5 illustrates a perspective view of at least one embodiment of the interactive jewelry vending machine with the point of sale system externally connected and the product collection door closed.

FIG. 5 illustrates a cut out perspective view of the interactive jewelry vending machine 100 that is shown with the product collection door 103 closed as opposed to open as shown in FIG. 4.

Figure 7:
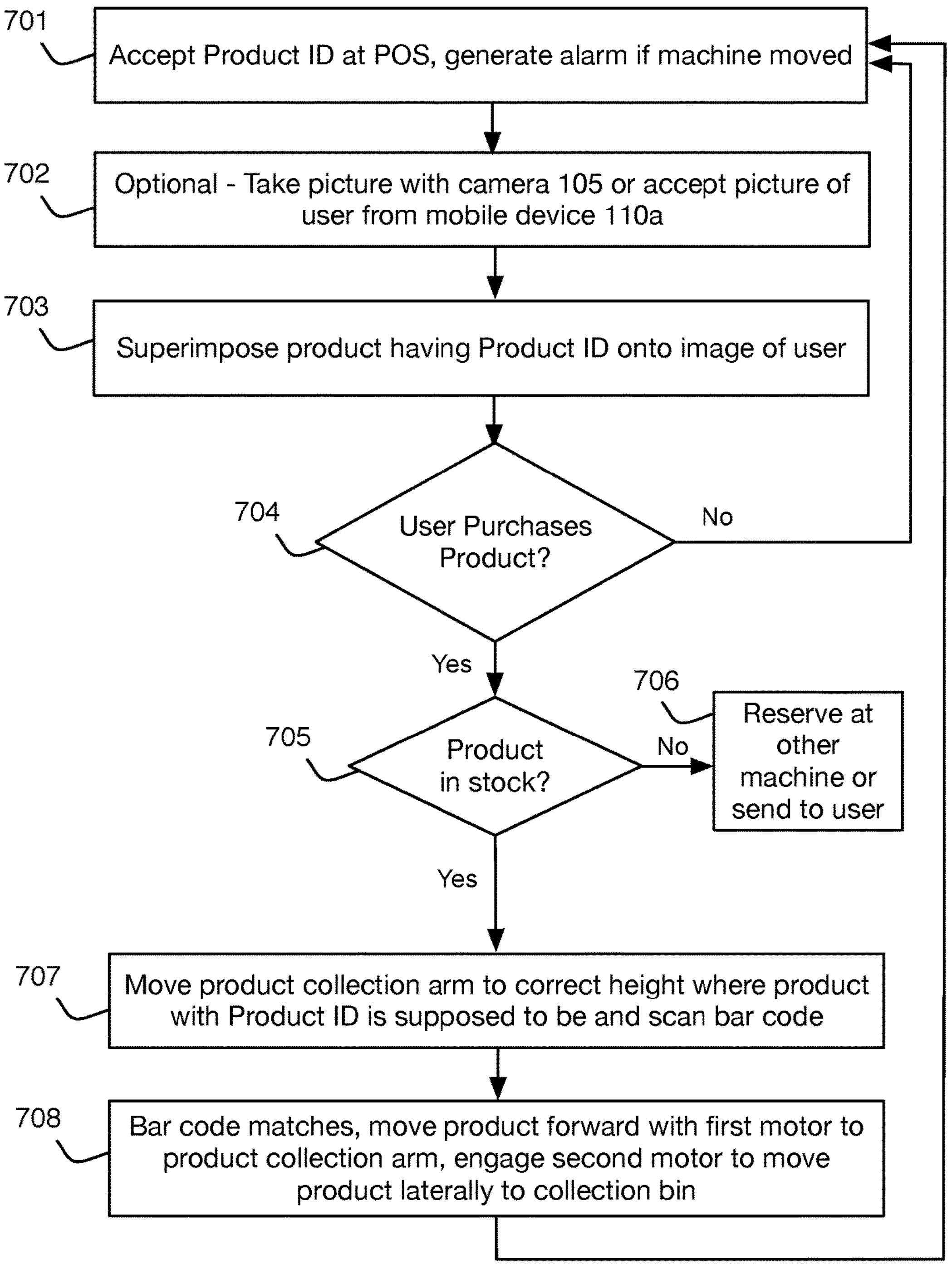
FIG. 7 illustrates a flow chart for processing in the system.

Using the architecture of FIG. 6 as described above, FIG. 7 illustrates the processing that occurs in the system. Processing starts at 701 wherein the system check for user input, and during this period may generate an alarm if the system is physically moved or tipped for example as determined by location determination unit 603 or sensors 112 that may include an inclinometer or tilt sensor or any other type of orientation sensor. The alarm may be silent or based on audio or light, or may be both, or a combination, for example silent alarm for a predetermined time and then also use audio or light or both. Images may be captured at this time with camera 105 and sent in the silent alarm to a security company or police for example.

At step 701, if the user enters a product ID for example at POS 110, then processing continues to 702. At step 702, optionally the system may capture an image of the user, or accept a picture from an app on mobile device 110*a* shown in FIG. 2 for example. In either case, the system may superimpose the product having the product ID selected by the user at POS 110 onto an image of the user as previously stated and as shown in step 703. The image may be superimposed by the app, in embodiments where the system sends a picture of the product with the product ID selected by the user to the mobile device 110*a*. In one or more embodiments, both the system and mobile device 110*a* may display the superimposed product and user.

If the user purchases the product at 704, then the system determines if the product is locally in stock in the machine. If the user does not purchase the product, then processing continues at 701. In the case where the product is purchased and is not in stock then the system may query the user at 706 for an address to send the product or send the purchase to any other vending machines that the user desires to pick up the product from. Thus, wireless system 607 may be utilized to communicate with a server 620 at the company that owns the vending machines and determine a location for an in stock product with that product ID and return the location to the user at POS 110. In addition, the server may send a message to another vending machine to reserve one or more of the products as purchased by the user for pickup when the user goes to that location.

If the product is in stock at the current vending machine that the user is at, then the product collection arm is moved to the correct height and the bar code is scanned at 707 to ensure that the product purchased is the product having the product ID as selected by the user. This eliminates erroneous purchases, which increases user confidence and satisfaction. If the bar code is a match, then the product is moved forward by first motor 304 and then laterally via second motor 106 along the product collection arm 107 to the product collection area 103. Processing then begins over at 701.

Embodiments of the connection between point of sale system 110 and control board 104, may also utilize any suitable coupling method that will allow communication between the two. As shown, the product collection door 103 is closed, preventing access to product collection bin 306.

While the invention herein disclosed has been described by means of specific embodiments and applications thereof, numerous modifications and variations could be made thereto by those skilled in the art without departing from the scope of the invention set forth in the claims.

What is claimed is:

1. An interactive jewelry vending machine comprising:

a body;

a viewing window coupled with the body to display a plurality of products;

at least one light coupled with the body to illuminate the plurality of products;

a plurality of product trays configured to hold the plurality of products;

a camera;

a point of sale system coupled with the camera wherein said point of sale system is configured to accept a product identifier of a product that a user purchases;

a credit card reader coupled with the point of sale system to purchase from the plurality of products;

a control board electrically coupled with the point of sale system;

a product collection arm configured to move vertically inside the body after receiving commands from the control board towards one of the plurality of products;

a plurality of height sensors electrically coupled with the control board configured to relay position of the product collection arm to the control board;

a barcode scanner coupled with the product collection arm configured to move horizontally in front of the plurality of products and capture a bar code of said product;

a plurality of first motors configured to move the plurality of products towards the product collection arm; and a second motor coupled with the product collection arm configured to move one of the plurality of products towards a product collection bin when said bar code corresponds to the product identifier of said product.

2. The interactive jewelry vending machine of claim 1, wherein the body further comprises a tank that holds water or at least one chemical or said water and said at least one chemical that provides additional weight to the body.

3. The interactive jewelry vending machine of claim 1, wherein the body further comprises a security gate configured to cover the plurality of products.

4. The interactive jewelry vending machine of claim 1, wherein the body further comprises a product collection door configured to protect one of the plurality of products purchased by the user until it is removed from the product collection bin.

5. The interactive jewelry vending machine of claim 1, wherein the point of sale system further comprises an application scanner to allow users to retrieve products purchased remotely.

6. The interactive jewelry vending machine of claim 1, wherein the plurality of height sensors communicate with the control board that the product collection arm is parallel to the product collection bin.

7. The interactive jewelry vending machine of claim 1, wherein the at least one light comprises a plurality of lights.

8. The interactive jewelry vending machine of claim 1, wherein the plurality of first motors are coupled with a plurality of helical coils configured to move the plurality of products towards the product collection arm.

9. The interactive jewelry vending machine of claim 1, further comprising a wireless communication system configured to relay availability of the plurality of products and allow remote purchase of the plurality of products.

10. The interactive jewelry vending machine of claim 9, wherein the wireless communication system is configured to relay alarm signals during break in attempts and relay position signals when the jewelry vending machine is moved.

11. An interactive jewelry vending machine comprising:

a body;

a viewing window coupled with the body to display a plurality of products;

at least one light coupled with the body to illuminate the plurality of products;

a plurality of product trays configured to hold the plurality of products;

a camera;

a point of sale system coupled with the camera;

wherein the point of sale system is configured to display images from the camera; and wherein the point of sale system is configured to display a rendition of images from the camera and the plurality of products;

a credit card reader coupled with the point of sale system to purchase from the plurality of products;

a control board electrically coupled with the point of sale system;

a product collection arm that is configured to move vertically inside the body after receiving commands from the control board towards one of the plurality of products that was purchased;

a plurality of height sensors electrically coupled with the control board configured to relay the product collection arm's position;

a barcode scanner coupled with the product collection arm configured to move horizontally in front of the plurality of products and capture a bar code of said product;

a plurality of first motors configured to move the plurality of products towards the product collection arm;

a second motor coupled with the product collection arm configured to move one of the plurality of products towards a product collection bin when said bar code corresponds to the product identifier of said product; and a wireless communication system;

wherein the wireless communication system is configured to relay availability of the plurality of products;

wherein the wireless communication system is configured to allow remote purchase of the plurality of products;

wherein the wireless communication system is configured to relay alarm signals during break in attempts; and wherein the wireless communication system is configured to relay position signals when the interactive jewelry vending machine is moved.

12. The interactive jewelry vending machine of claim 11, wherein the body further comprises a water tank that provides additional weight to the body.

13. The interactive jewelry vending machine of claim 11, wherein the body further comprises a security gate configured to cover the plurality of products.

14. The interactive jewelry vending machine of claim 11, wherein the body further comprises a product collection door configured to protect one of the plurality of products purchased by the user until it is removed from the product collection bin.

15. The interactive jewelry vending machine of claim 11, wherein the point of sale system further comprises an application scanner to allow users to retrieve products purchased remotely.

16. The interactive jewelry vending machine of claim 11, wherein the plurality of height sensors communicate to the control board that the product collection arm is parallel to the product collection bin.

17. The interactive jewelry vending machine of claim 11, wherein the at least one light comprises a plurality of lights.

18. The interactive jewelry vending machine of claim 11, wherein the plurality of first motors are coupled with a plurality of helical coils configured to move the plurality of products towards the product collection arm.

19. An interactive jewelry vending machine comprising:
a body;
a viewing window coupled with the body to display a plurality of products;
at least one light coupled with the body to illuminate the plurality of products;
a plurality of product trays configured to hold the plurality of products;
a security gate configured to cover the plurality of products;
a water tank that provides additional weight to the body;
a camera;
a point of sale system coupled with the camera;
wherein the point of sale system is configured to display images from the camera; and
wherein the point of sale system is configured to display a rendition of images from the camera and the plurality of products;
a credit card reader coupled with the point of sale system to purchase from the plurality of products;
a control board electrically coupled with the point of sale system;
a product collection arm that is configured to move vertically inside the body after receiving commands from the control board towards one of the plurality of products that was purchased;
a plurality of height sensors electrically coupled with the control board configured to relay the product collection arm's position relative to the plurality of products and a product collection bin;
a barcode scanner coupled with the product collection arm configured to move horizontally in front of the plurality of products and capture a bar code of said product;
a plurality of first motors configured to move the plurality of products towards the product collection arm;
a second motor coupled with the product collection arm configured to move one of the plurality of products towards the product collection bin when said bar code corresponds to the product identifier of said product;
a product collection door configured to protect one of the plurality of products purchased by the user until it is removed from the product collection bin;
a battery; and
a wireless communication system electrically coupled to the battery;
wherein the wireless communication system is configured to relay availability of the plurality of products;
wherein the wireless communication system is configured to allow remote purchase of the plurality of products;
wherein the wireless communication system is configured to relay alarm signals during break in attempts; and
wherein the wireless communication system is configured to relay position signals when the vending machine is moved.

20. The interactive jewelry vending machine of claim 19, wherein the point of sale system further comprises an application scanner to allow users to retrieve products purchased remotely.

* * * * *